(12) United States Patent
Cao et al.

(10) Patent No.: US 9,563,235 B2
(45) Date of Patent: Feb. 7, 2017

(54) WEARABLE DEVICE (71) Applicant: BOE TECHNOLOGY GROUP CO., LTD., Beijing (CN)

(72) Inventors: Lei Cao, Beijing (CN); Changlin Leng, Beijing (CN); Yefei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/801,923

(22) Filed: Jul. 17, 2015

(65) Prior Publication Data

US 2016/0252928 A1    Sep. 1, 2016

(30) Foreign Application Priority Data

Feb. 27, 2015  (CN) .......................... 2015 1 0089271

(51) Int. Cl.
*G06F 1/16* (2006.01)

(52) U.S. Cl.
CPC ..................... *G06F 1/163* (2013.01)

(58) Field of Classification Search
CPC ...................................................... G06F 1/163
See application file for complete search history.

(56) References Cited

U.S. PATENT DOCUMENTS

| | | | | |
|---|---|---|---|---|
| 5,416,730 A * | 5/1995 | Lookofsky | ............... | G06F 1/163 361/679.02 |
| 5,450,596 A * | 9/1995 | Felsenstein | ............. | G06F 1/163 345/8 |
| 5,491,651 A * | 2/1996 | Janik | ........................ | G06F 1/163 361/679.03 |
| 5,572,401 A * | 11/1996 | Carroll | ..................... | G06F 1/163 361/679.03 |
| 5,610,387 A * | 3/1997 | Bard | ....................... | G04B 47/00 235/462.44 |
| 5,774,338 A * | 6/1998 | Wessling, III | .......... | G06F 1/163 2/94 |
| 5,873,070 A * | 2/1999 | Bunte | ................... | G02B 27/017 235/385 |
| 5,898,161 A * | 4/1999 | DeVita | ............... | G04B 37/0016 235/462.44 |
| 5,914,585 A * | 6/1999 | Grabon | .................... | G06F 1/163 307/29 |
| 6,137,675 A * | 10/2000 | Perkins | .................... | G06F 1/163 128/876 |
| 6,249,427 B1 * | 6/2001 | Carroll | .................... | G06F 1/1616 361/679.03 |
| 6,282,089 B1 * | 8/2001 | Nakanishi | ................ | G06F 1/163 361/679.47 |
| 6,356,437 B1 * | 3/2002 | Mitchell | ................... | G06F 1/163 342/352 |
| 6,380,923 B1 * | 4/2002 | Fukumoto | ............... | G06F 1/163 341/22 |

(Continued)

*Primary Examiner* — Lisa Lea Edmonds (74) *Attorney, Agent, or Firm* — Harness, Dickey & Pierce, P.L.C.

(57) ABSTRACT

The present disclosure provides a wearable device, including a main body including a central processing unit and a display panel; and a connection member electrically connected to the main body and including a plurality of functional modules, at least one of which is provided with a control assembly configured to control an operational state of the functional module where the control assembly is located.

16 Claims, 7 Drawing Sheets

(56) References Cited

U.S. PATENT DOCUMENTS

| | | | | |
|---|---|---|---|---|
| 6,522,531 | B1* | 2/2003 | Quintana | G06F 1/163 |
| | | | | 342/357.52 |
| 6,529,372 | B1* | 3/2003 | Ng | G06F 1/163 |
| | | | | 312/223.2 |
| 6,619,835 | B2* | 9/2003 | Kita | A44C 5/0015 |
| | | | | 368/10 |
| 6,754,069 | B2* | 6/2004 | Harada | G06F 1/1601 |
| | | | | 361/679.03 |
| 7,618,260 | B2* | 11/2009 | Daniel | A44C 5/0007 |
| | | | | 24/311 |
| 7,764,488 | B2* | 7/2010 | Calvarese | G06F 1/163 |
| | | | | 224/930 |
| 2001/0043514 | A1* | 11/2001 | Kita | A44C 5/0015 |
| | | | | 368/281 |
| 2011/0007468 | A1* | 1/2011 | Burton | G04F 10/00 |
| | | | | 361/679.03 |
| 2015/0051470 | A1* | 2/2015 | Bailey | A61B 5/681 |
| | | | | 600/384 |
| 2015/0223355 | A1* | 8/2015 | Fleck | G06F 1/163 |
| | | | | 361/679.03 |
| 2015/0234426 | A1* | 8/2015 | Bailey | G06F 1/163 |
| | | | | 361/679.03 |
| 2015/0342522 | A1* | 12/2015 | Justice | A61B 5/02427 |
| | | | | 600/301 |
| 2016/0062392 | A1* | 3/2016 | Townsend | G06F 1/163 |
| | | | | 361/679.03 |
| 2016/0066858 | A1* | 3/2016 | Crawford | A61B 5/7264 |
| | | | | 600/301 |

* cited by examiner

WEARABLE DEVICE

CROSS-REFERENCE TO RELATED APPLICATION

The present application claims a priority of the Chinese patent application No. 201510089271.3 filed on Feb. 27, 2015, which is incorporated herein by reference in its entirety.

TECHNICAL FIELD

The present disclosure relates to the field of an electronic product, in particular to a wearable device.

BACKGROUND

Along with the development of electronic intelligence technology, various wearable devices, e.g., smart wristbands, smart watches and smart spectacles, are emerging. To meet the market demands, the functions of the wearable devices are highly demanded, and meanwhile it is required to develop new functions.

Usually, a wearable device includes a main body and a connection member. The main body, as a core member of the wearable device, includes a central processing unit and a display screen, and the connection member is used to wear the wearable device onto a body of a user. In order to meet the market demands, the wearable device may be provided with a plurality of functional modules. When the functional modules are arranged within the main body, a size of the main body will inevitably be increased. Taking a smart watch as an example, when the main body is oversized, it is uneasy to carry it, and the appearance thereof is adversely affected. Hence, it is able to reduce the size of the main body to some extent when the plurality of functional modules is arranged within the connection member. However, in the related art, operational states of the functional modules are still controlled by the main body even when the functional modules are arranged within the connection member, so it is still required to provide the main body with corresponding structures, e.g., buttons, for controlling the operational states thereof. At this time, the size of the main body will be somewhat increased, and it is still unable to meet the market demands.

SUMMARY

An object of the present disclosure is to provide a wearable device, so as to prevent a main body from being oversized while developing new functions.

In one aspect, the present disclosure provides in one embodiment a wearable device, including: a main body including a central processing unit and a display panel; and a connection member electrically connected to the main body and including one or more functional modules, at least one of which is provided with a control assembly configured to control an operational state of the functional module.

Further, the control assembly includes: a contact head fixedly arranged at an outer surface of the functional module where the control assembly is located and connected to an internal circuit of the functional module; and a movable stripe movably arranged on the functional module where the control assembly is located. The movable stripe is reciprocated so as to contact with or be far away from the contact head, thereby to control on and off states of the internal circuit of the functional module.

Further, the contact head is a contact column protruding from the outer surface of the functional module where the control assembly is located.

Further, the contact head protrudes from the outer surface of the functional module where the control assembly is located, and has a fixed height relative to the outer surface of the functional module.

Further, the contact head includes: a first end connected to the outer surface of the functional module where the control assembly is located; and a second end in contact with the movable stripe and arranged opposite to the first end. The second end is of an oblique or cambered end surface, so as to guide the movable stripe to be in contact with the end surface of the second end.

Further, the movable stripe includes: a rotatable stripe capable of being rotated so as to contact with or be far away from the contact head; and a rotatable member configured to connect the rotatable stripe onto the functional module and enable the rotatable stripe to be rotated.

Further, the rotatable member at least includes a stationary shaft secured onto the outer surface of the functional module. One end of the rotatable stripe is sleeved onto the stationary shaft, and the other end is rotatable around the stationary shaft so as to contact with or be far away from the contact head.

Further, the functional module includes two side surfaces arranged opposite to each other, two main surfaces arranged opposite to each other, and two connection end surfaces arranged opposite to each other and configured to be connected to the main body or the other functional modules. The rotatable stripe at least includes a first movable stripe member connected to the rotatable member, and a second movable strip member in contact with the contact head and formed by curving the first movable stripe member. The contact head is arranged on at least one of the side surfaces, the rotatable member is arranged on at least one of the connection end surfaces and adjacent to the side surface where the contact head is arranged, and the first movable stripe member is rotatable around the rotatable member so as to drive the second movable stripe member to move to the side surface, thereby to enable the second movable stripe member to contact with the contact head, or drive the second movable stripe member to move to the main surface, thereby to enable the second movable stripe member to be far away from the contact head. Alternatively, the contact head is arranged on at least one of the main surfaces, the rotatable member is arranged on at least one of the connection end surfaces, and the first movable stripe member is rotatable around the rotatable member so as to drive the second movable stripe member to move to the main surface, thereby to enable the second movable stripe member to contact with the contact head, or drive the second movable stripe member to move to the side surface, thereby to enable the second movable stripe member to be far away from the contact head.

Further, the movable stripe includes a slidable stripe capable of being slid on the outer surface of the functional module, so as to contact with or be far away from the contact head; and a slidable member configured to connect the slidable stripe onto the functional module and enable the slidable stripe to be slid. The contact head may be a thin metal sheet. When the slidable stripe is slid onto the thin metal sheet so as to be in contact therewith, the functional module is started up, and when the slidable stripe moves away from the thin metal sheet, the functional module is shut down.

Further, the control assembly includes at least one stopping member configured to stop the movable stripe when the movable stripe contacts with or is far away from the contact head, so as to prevent the movable stripe from being offset.

Further, the stopping member comprises a first stopping member through which the movable stripe is stopped when the movable stripe contacts with the contact head, and a second stopping member through which the movable stripe is stopped when the movable stripe is far away from the contact head.

Further, the first stopping member is arranged at the side surface of the functional module, and the second stopping member is arranged at the main surface of the functional module.

Further, the functional module includes a housing provided with a plurality of ventilation holes, and a functional processing unit arranged within the housing.

Further, the functional module includes two side surfaces arranged opposite to each other, two main surfaces arranged opposite to each other, and two connection end surfaces arranged opposite to each other and connected to the main body or the other functional modules.

The wearable device further includes a connection sheet connecting the functional modules. The connection sheet is arranged between two adjacent functional modules and partially overlaps the main surfaces of the two adjacent functional modules, and the functional modules are connected to the connection sheet at positions where the functional modules overlap the connection sheet, respectively.

Further, one of the two adjacent functional modules is formed integrally with the connection sheet, and the other functional module is detachably connected to the connection sheet.

DETAILED DESCRIPTION

The present disclosure will be described hereinafter in conjunction with the drawings and embodiments. The following embodiments are for illustrative purposes only, but shall not be used to limit the scope of the present disclosure.

The present disclosure provides in one embodiment a wearable device, so as to prevent a main body from being oversized due to new functions, thereby to prevent the portability and appearance thereof from being adversely affected, As shown in FIGS. 1 to 5, which are schematic views showing the wearable device according to one embodiment of the present disclosure, the wearable device is of a watch form for an illustrative purpose. It should be appreciated that, the wearable device may also be such devices as smart spectacles, a smart wrist or a smart earphone which may be worn onto a body of a user, and a shape and a structure of which are not limited to those shown in FIGS. 1 to 2.

Figure 1:
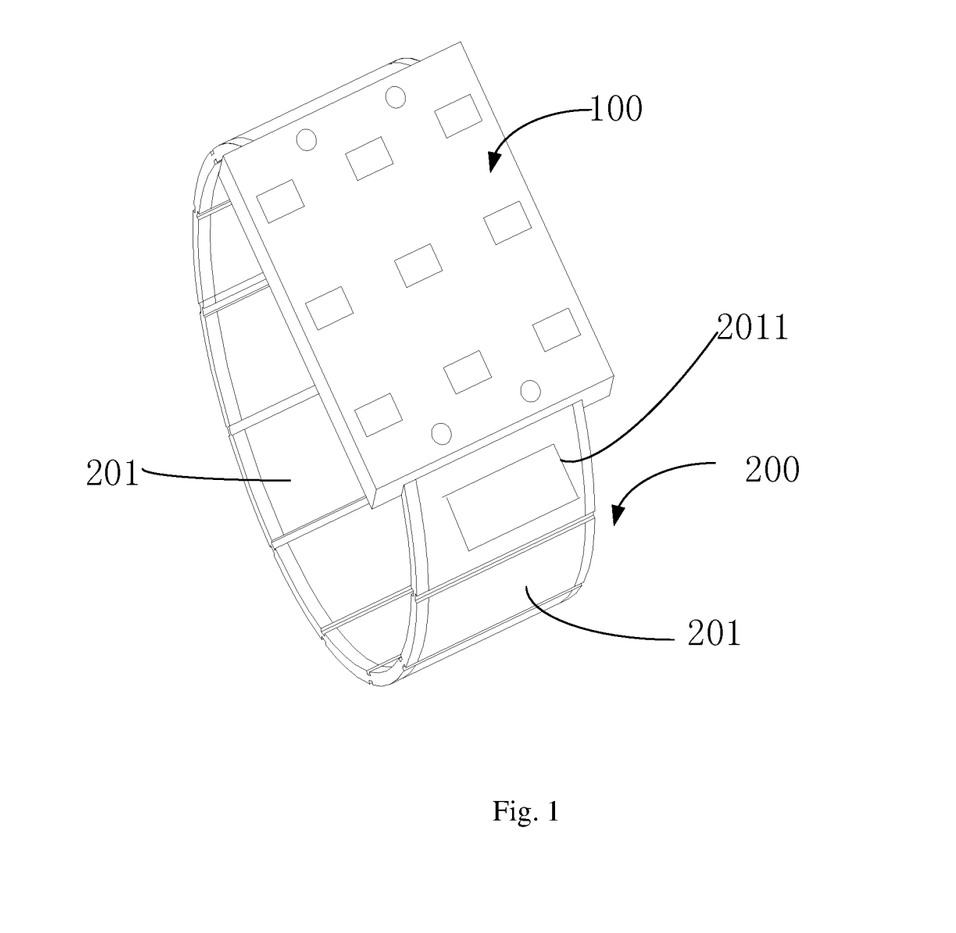
FIG. 1 is a schematic view showing a wearable device according to one embodiment of the present disclosure.
Figure 2:
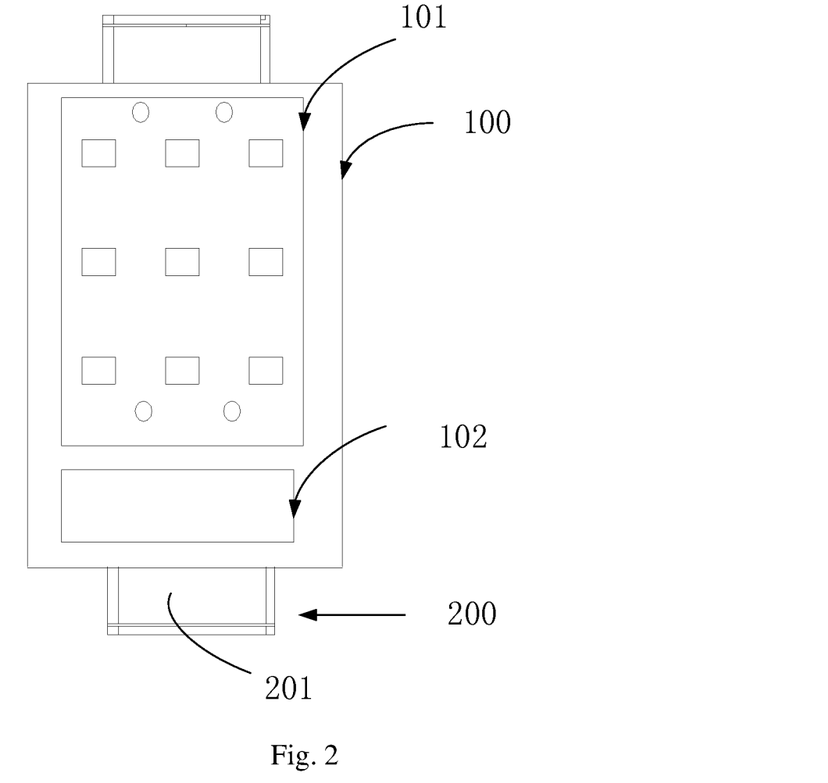
FIG. 2 is a schematic view showing the wearable device viewing from another angle according to one embodiment of the present disclosure.

As shown in FIGS. 1 to 2, the wearable device includes: a main body 100 including a central processing unit 102 and a display panel 101; and a connection member 200 for enabling the wearable device to be worn onto the body of the user, the connection member 200 is electrically connected to the main body 100 and includes a plurality of functional modules 201, at least one of which is provided with a control assembly configured to control an operational state of the functional module 201.

According to the embodiment of the present disclosure, at least one of the functional modules 201 of the connection member 200 is provided with the control assembly 2011 so as to control the operational state of the functional module 201 where the control assembly is located and/or the other functional modules, thereby to trigger corresponding functions thereof. As a result, it is unnecessary to provide a corresponding triggering structure for controlling the functional module 201 on the main body 100, thereby it is able to prevent a size of the main body 100 from being oversized due to the functional module 201 while providing the wearable device with the corresponding function of the functional module 201.

It should be appreciated that, in the embodiment of the present disclosure, the control assembly may be arranged on one functional module 201, or the control assemblies may be arranged on the functional modules 201, respectively, or the control assembly may be arranged on at least one of a group of functional modules 201 so as to control operational states of this group of functional modules 201.

In addition, the operational state of the functional module 201 controlled by the control assembly may include on/off states of the functional module 201, or any other states. For example, when the functional module 201 is an audio module, the control assembly may be used to control a volume of the audio module, apart from the on or off state thereof.

Figure 3:
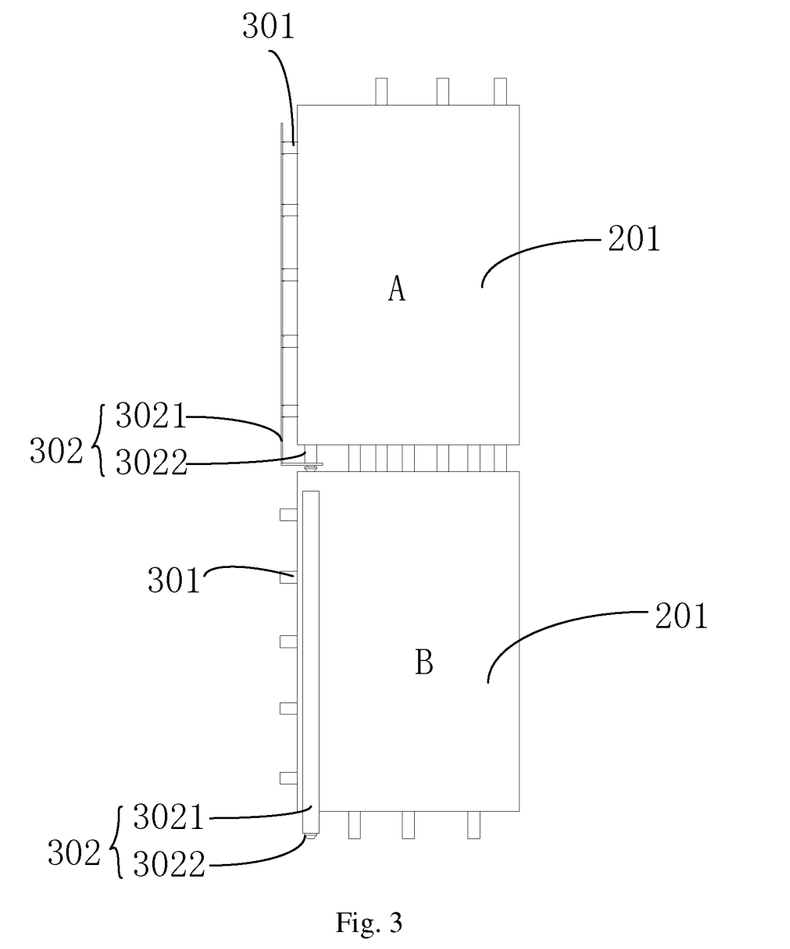
FIG. 3 is a schematic view showing two functional modules of the wearable device according to one embodiment of the present disclosure.
Figure 4:
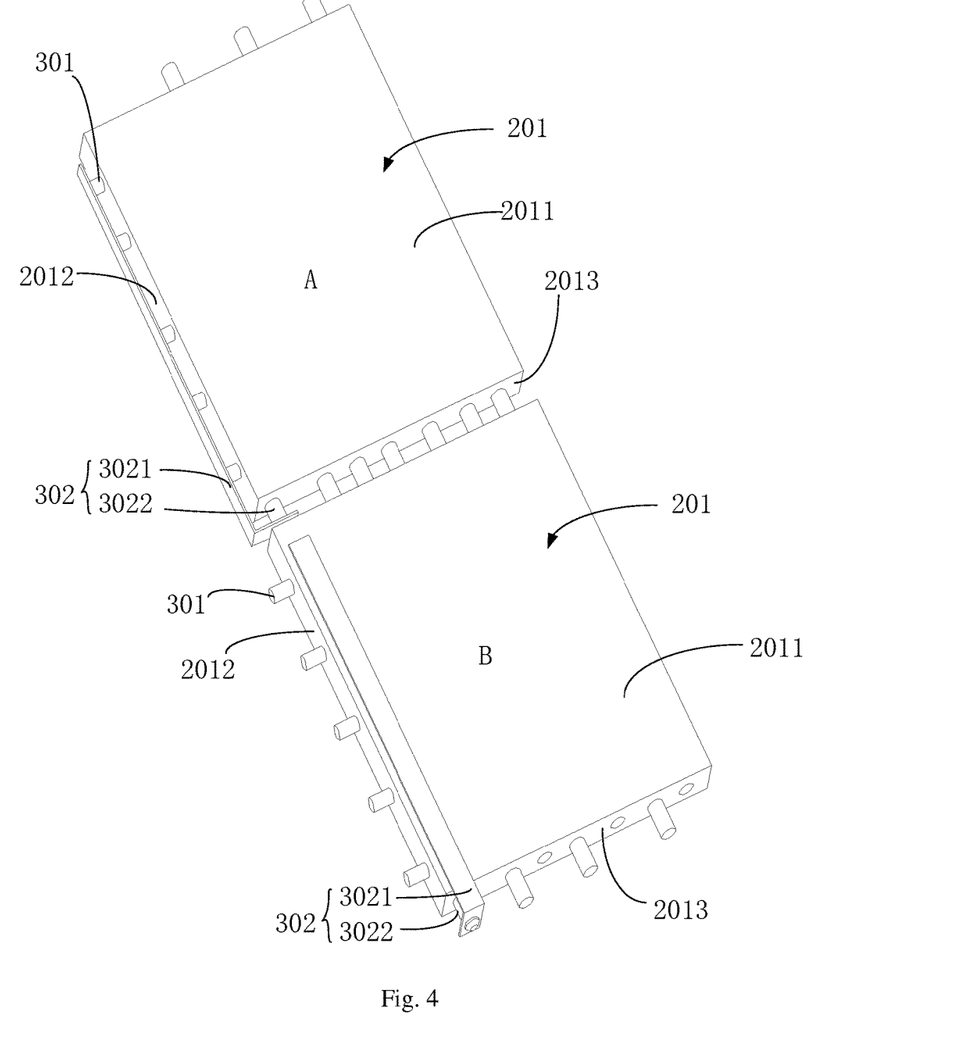
FIG. 4 is a schematic view showing the two functional modules of the wearable device viewing from another angle according to one embodiment of the present disclosure.

In an alternative embodiment, the control assembly is a switch for controlling the on/off states of the functional module 201 where the control assembly is located. The switch may be provided in various forms. As shown in FIGS. 3 and 4, the control assembly includes: a contact head 301 fixedly arranged at an outer surface of the functional module 201 where the control assembly is located and connected to an internal circuit of the functional module 201; and a movable stripe 302 movably arranged on the outer surface of the functional module 201 where the control assembly is located. The movable stripe 302 is capable of being reciprocated so as to contact with or be far away from the contact head 301, thereby to control the on and off states of the internal circuit of the functional module 201.

The movable stripe 302 may be moved so as to enable it to contact with the contact head 301 (as shown by a first functional module A in FIGS. 3-4), thereby to trigger the corresponding function of the functional module 201. Also, the movable stripe 302 may be moved so as to enable it to be far away from the contact head 301 (as shown by a second functional module B in FIGS. 3-4), thereby to disenable the corresponding function of the functional module 201.

In addition, the control assembly is of a structure of a mechanical switch, and in the actual application, it may also be a touch screen switch or a button switch. The structure of the control assembly is not particularly defined herein. It should be appreciated that, as compared with the mechanical switch, the touch screen switch is expensive, and it is uneasy to control it when it is undersized due to a limited size of the functional module 201. In addition, the connection member 200 is usually of a strip-like shape, so the size of the functional module 201 should not be too large. When the button switch, which may operate at a certain travelling distance so as to control the functional module 201, is adopted, sufficient room is required to be reserved in the functional module 201 for the travelling distance of the button switch, which thus results in an increase in the size of the functional module 201 as well as a complex structure thereof, and thereby results in an increase in the production cost. In the alternative embodiment of the present disclosure, the contact head 301 and the movable stripe 302 of the control assembly are both arranged at the outer surface of the functional module 201, so it is merely required to electrically connect the contact head 301 and the movable stripe 302 to the internal circuit of the functional module 201. In this way, the sizes of the contact head 301 and the movable stripe 302 may depend on the practical needs, and as a result, it is unnecessary to provide additional room within the functional module 201, thereby it is able to prevent an increase in the production cost due to the complex internal structure of the functional module 201.

In an alternative embodiment, as shown in FIG. 1, the contact head 301 is a contact column protruding from the outer surface of the functional module 201 where the control assembly is located. The contact column is of a simple structure and may be manufactured easily. It should be appreciated that, in some other embodiments, the contact head 301 may be in any other forms, and the structure thereof is not particularly defined herein. For example, the contact head 301 may be a thin metal sheet arranged on the outer surface of the functional module 201.

Alternatively, as shown in FIGS. 3-4, the contact head 301 protrudes from the outer surface of the functional module 201 where the control assembly is located, and has a fixed height relative to the outer surface of the functional module 201. To be specific, the contact head 301 may be of a columnar structure with a fixed height, so as to simplify its structure and facilitate the implementation thereof. The contact head 301 contacts with or is far away from the movable stripe 302, so as to control the operational state, e.g., the on or off state, of the functional module 201.

It should be appreciated that, in the other embodiments of the present disclosure, the contact head 301 may also be a telescopic column, one end of which is secured onto the outer surface of the functional module 201 and the other end of which is telescopic relative to the one end. As shown in FIG. 3, one end of the contact head 301 is secured onto the functional module 201 and the other end is telescopic. When the movable stripe 302 contacts with the telescopic end, the height of the contact head 301 is compressed, so as to reduce the size of the entire functional module 201. However, as compared with the contact column with a fixed height, the telescopic column is of a complex structure. In addition, the contact column with the fixed height may be directly formed on the functional module 201, while the manufacture of the telescopic column is relatively complex.

Figure 5:
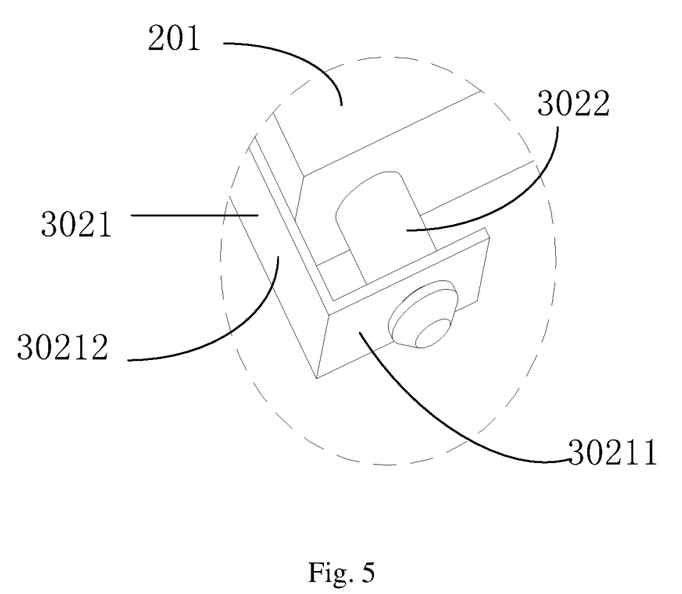
FIG. 5 is a schematic view showing a state where a rotatable stripe is engaged with a stationary shaft according to one embodiment of the present disclosure.

In an alternative embodiment, as shown in FIGS. 3-5, the movable stripe 302 includes: a rotatable stripe 3021 capable of being rotated so as to contact with or be far away from the contact head 301; and a rotatable member 3022 configured to connect the rotatable stripe 3021 onto the functional module 201 and enable the rotatable stripe 3021 to be rotated.

Figure 8:
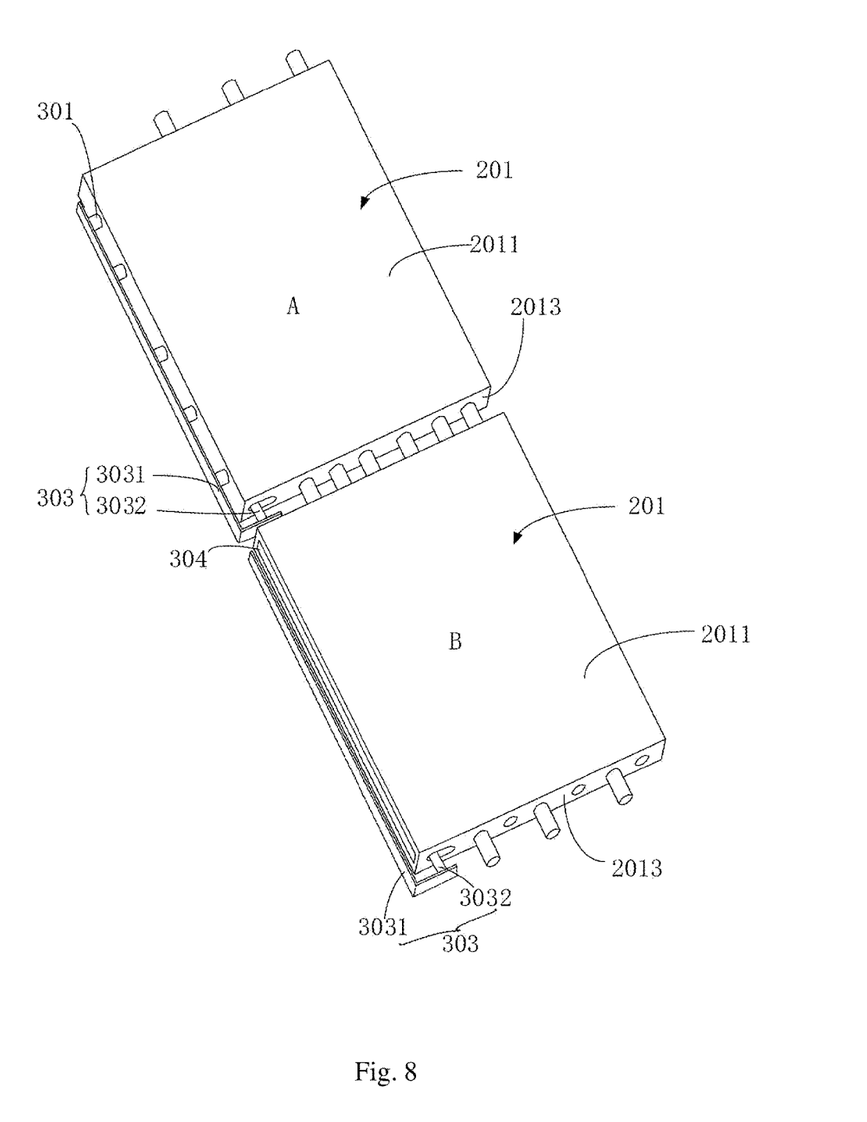
FIG. 8 is another schematic view showing the two functional modules of the wearable device viewing from another angle according to one embodiment of the present disclosure.

In the above embodiment, the movable stripe 302 consists of the rotatable stripe 3021 and the rotatable member 3022. The rotatable stripe 3021 moves in a rotational manner, so as to contact with or be far away from the contact head 301. It should be appreciated that, in some other embodiments, the movable stripe 302 may be implemented in other modes. For example, as shown in FIG. 8, the movable stripe 303 may include a slidable stripe 3031 capable of being slid on the outer surface of the functional module 201, so as to contact with or be far away from the contact head 301; and a slidable member 3032 configured to connect the slidable stripe onto the functional module 201 and enable the slidable stripe to be slid. The contact head 301 may be a thin metal sheet 304. When the slidable stripe is slid onto the thin metal sheet so as to be in contact therewith, the functional module 201 is started up, and when the slidable stripe moves away from the thin metal sheet, the functional module 201 is shut down. In addition, it should be appreciated that, the movable stripe 302 may be one of the rotatable stripe 3021 and the slidable stripe. Of course, in the other embodiments, the movable stripe 302 may also be a combination of the rotatable stripe 3021 and the slidable stripe.

In an alternative embodiment, as shown in FIG. 5, the rotatable member 3022 at least includes a stationary shaft secured onto the outer surface of the functional module 201. One end of the rotatable stripe 3021 is sleeved onto the stationary shaft, and the other end is rotatable around the stationary shaft so as to contact with or be far away from the contact head 301. In this embodiment, as shown in FIG. 5, the stationary shaft may be a pin or any other member, which is not particularly defined herein.

In some other embodiments, the rotatable member 3022 may also be in any other forms, as long as it may drive the rotatable stripe 3021 to rotate so as to enable the rotatable stripe 3021 to contact with or be far away from the contact head 301. For example, the rotatable member 3022 may be a rotatable shaft, one end of which is fixedly connected to one end of the rotatable stripe 3021 and the other end of which is flexibly connected to the functional module 201. The rotatable shaft drives the rotatable stripe 3021 to rotate, so as to enable the rotatable stripe 3021 to contact with or be far away from the contact head 301. It should be appreciated that, as compared with the mode where the rotatable shaft is adopted, the structure of the functional module 201 will not remarkably affected when the stationary shaft is secured onto the functional module 201. As a result, the size of the internal structure of the functional module 201 is not adversely affected, and the manufacture thereof is relatively simple.

Alternatively, as shown in FIGS. 3-4, the functional module 201 includes two side surfaces 2012 arranged opposite to each other, two main surfaces 2011 arranged opposite to each other, and two connection end surfaces 2013 arranged opposite to each other and configured to be connected to the main body 100 or the other functional modules 201.

The rotatable stripe 3021 at least includes a first movable stripe member 30211 connected to the rotatable member 3022, and a second movable stripe member 30212 in contact with the contact head 301 and formed by curving the first movable stripe member.

The contact head 301 is arranged on at least one of the side surfaces 2012, the rotatable member 3022 is arranged on at least one of the connection end surfaces 2013 and adjacent to the side surface 2012 where the contact head 301 is arranged, and the first movable stripe member is rotatable around the rotatable member 3022 so as to drive the second movable stripe member to move to the side surface 2012, thereby to enable the second movable stripe member to be contact with the contact head 301, or drive the second movable stripe member to move to the main surface 2011, thereby to enable the second movable stripe member to be far away from the contact head 301.

In the above embodiment, the stationary shaft is arranged on the connection end surface 2013 of the functional module 201. The rotatable stripe 3021 may be of an L-shaped structure, and the first movable stripe member of the rotatable stripe 3021 is rotated around the rotatable member 3022, so as to drive the second movable stripe member to move to the side surface 2012 of the functional module 201 with the contact head 301, thereby to enable the second movable stripe member to contact with the contact head 301. After the second movable stripe member moves to the main surface 2011, it is far away from the contact head 301. In this way, the size of the functional module 201 may not be adversely affected when the rotatable stripe 3021 contacts with or is far away from the contact head 301, and as a result, the appearance of the functional module 201 will not adversely affected and the operation thereof will be facilitated.

Of course, it should be appreciated that, in the actual application, the rotatable stripe 3021 may be of any other structure, which is not particularly defined herein.

It should be further appreciated that, the contact head 301 and the rotatable stripe 3021 may be arranged at any positions at the outer surface of the functional module 201. For example, the contact head 301 may be arranged on at least one of the main surfaces 2011, the rotatable member 3022 may be arranged on at least one of the connection end surfaces 2013, and the first movable stripe member is rotatable around the rotatable member 3022 so as to drive the second movable stripe member to move to the main surface 2011, thereby to enable the second movable stripe member to contact with the contact head 301, or drive the second movable stripe member to move to the side surface 2012, thereby to enable the second movable stripe member to be far away from the contact head 301.

In an alternative embodiment, as shown in FIGS. 3-4, the rotatable stripe 3021 is rotated so as to contact with one end of the contact column, thereby to stop the rotatable stripe 3021 through an interference fit. However, upon the long-term, repeated operations, the rotatable stripe 3021 and the contact column may probably be worn down, and imperfect contact or offset will occur. In some other embodiments, the control assembly may further include a stopping member configured to stop the movable stripe 302 when the movable stripe 302 contacts with or is far away from the contact head 301, so as to prevent the movable stripe 302 from being offset. In this way, when the movable stripe 302 contacts with the contact head 301, it may be stopped through one stopping member, and when the movable stripe 302 is far away from the contact head 301, it may be stopped through another stopping member, so as to prevent the occurrence of the imperfect contact or the accidental offset of the movable stripe 302, thereby to ensure the control reliability.

The stopping member may be of various structures. For example, in an alternative embodiment, when the L-shaped rotatable stripe 3021 is adopted, the stopping member may include a first stopping block arranged at the side surface 2012 of the functional module 201 and a second stopping block arranged at the main surface 2011 of the functional module 201.

In addition, alternatively, the contact head 301 includes a first end connected to the outer surface of the functional module 201 where the control assembly is located, and a second end arranged opposite to the first end and configured to be in contact with the movable stripe 302. The second end is of an oblique or cambered end surface, so as to guide the movable stripe 302 to contact with the end surface of the second end.

By providing the end of the contact column with the oblique or cambered surface, it is able to gradually guide the rotatable stripe 3021 to be in an interference fit to the end of the contact column.

In addition, it should be appreciated that, one or more control assemblies, i.e., contact columns, may be arranged on the functional module 201. When a plurality of control assemblies is arranged on the functional module 201, they may be used to control the operational states of the functional module 201, or may serve as standby contact columns, or may be used to improve the contact effectiveness. Correspondingly, there may be a plurality of rotatable stripes 3021, so as be matched with the contact columns in a one-to-one correspondence manner. Alternatively, there may be only one rotatable stripe 3021, and the structure of the first movable stripe member or the second movable stripe member of the rotatable stripe 3021 may be modified so that the rotatable stripe 3021 may cooperate with the contact columns. For example, a plurality of contact columns may be arranged along the side surface 2012 of the functional module 201, a long rail may be arranged on the second movable stripe member of the rotatable stripe 3021, and at least one slider may be arranged on the rail. The slider may be moved along the rail to different positions, so as to be in contact with different contact columns, thereby to trigger the functions corresponding to the different contact columns.

In addition, it is required, as a development trend, to thin the wearable device, and a thin functional module may facilitate the heat dissipation of an internal chip therein. For the existing wearable device, as shown in FIGS. 3-4, the adjacent functional modules 201 of the connection member 200 are adjoined to each other through their connection end surfaces 2013, or secured via connection blocks at the side surfaces 2012 of the adjacent functional modules 201. However, when the functional module 201 is too thin, an area of the connection end surface 2013 or the side surface 2012 is too small, and there is no sufficient room to receive such a connection structure as a pin hole, so the connection structure may be not so firm.

Figure 7:
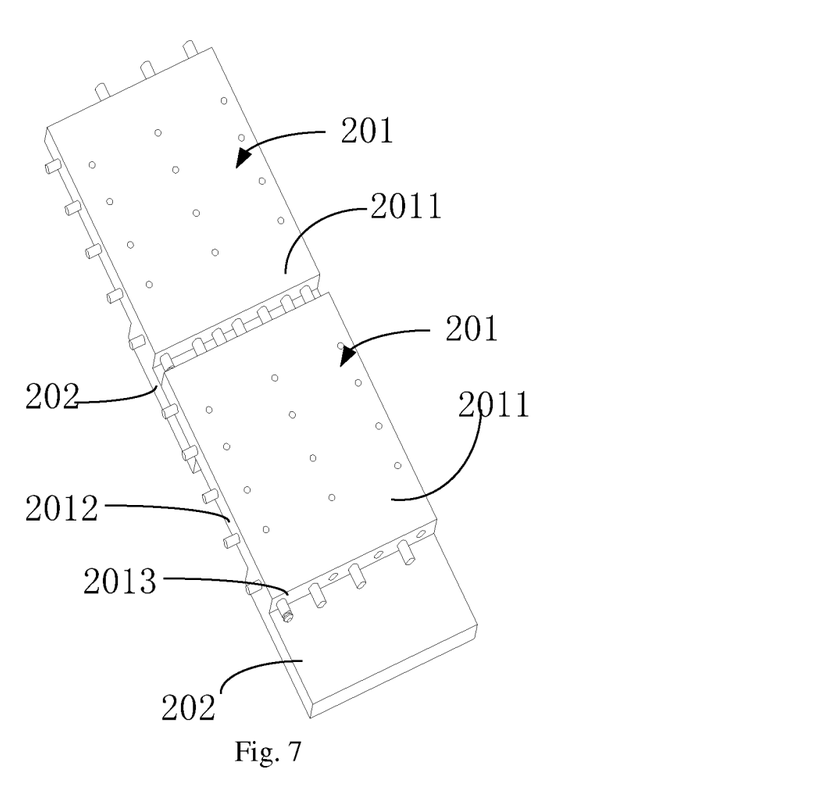
FIG. 7 is a schematic view showing a connection mode for two functional modules according to one embodiment of the present disclosure.

FIG. 7 is a schematic view showing one connection mode of the wearable device where, to be clear, no control assembly is shown. In order to overcome the above defect, in an embodiment, as shown in FIG. 7, the wearable device further includes a connection sheet 202 connecting the functional modules 201. The connection sheet 202 is arranged between two adjacent functional modules 201 and partially overlaps the main surfaces 2011 of the two adjacent functional modules 201, and the functional modules 201 are connected to the connection sheet at positions where the functional modules overlap the connection sheet, respectively.

In the above embodiment, the connection sheet 202 is arranged under the main surfaces 2011 of the two adjacent modules 201, so as to firmly connect the main surfaces 2011 of the functional modules 201. In addition, functional module 201 merely overlaps the connection sheet at its edge, and its body is still very thin, so it is able to facilitate the heat dissipation.

Figure 6:
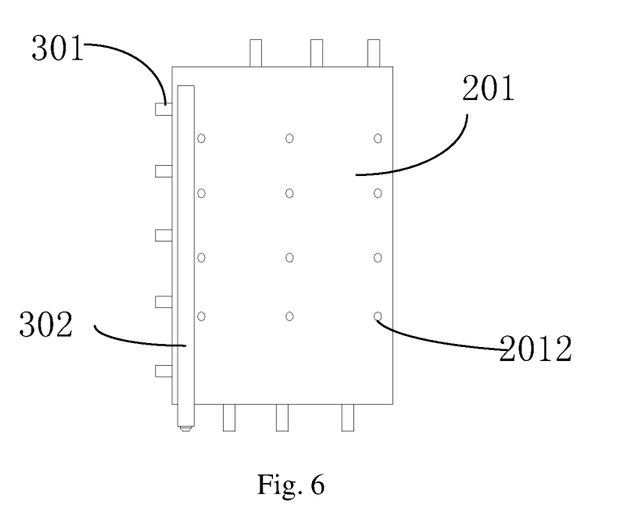
FIG. 6 is a schematic view showing a functional module according to one embodiment of the present disclosure.

Alternatively, as shown in FIGS. 6-7, one of the two adjacent functional modules 201 is formed integrally with the connection sheet 202, and the other functional module 201 is detachably connected to the connection sheet 202. To be specific, the connection sheet and one of the functional modules 201 are formed as a single piece, i.e., at least one end of the functional module 201 is formed into the connection sheet. Alternatively, the functional module 201 is of a Z-like structure.

In an alternative embodiment, as shown in FIG. 6, the functional module 201 includes a housing and a functional processing unit arranged within the housing. The housing is provided with a plurality of ventilation holes 2012, so as to form natural convection, thereby to reduce a temperature of the chip inside the functional module 201.

The above are merely the preferred embodiments of the present disclosure. It should be appreciated that, a person skilled in the art may make further modifications and improvements without departing from the principle of the present disclosure, and these modifications and improvements shall also fall within the scope of the disclosure.

What is claimed is:

1. A wearable device, comprising:
a main body including a central processing unit and a display panel; and
a connection member electrically connected to the main body and including one or more functional modules, at least one of which is provided with a control assembly configured to control an operational state of the functional module,
wherein the control assembly comprises a contact head fixedly arranged at an outer surface of the functional module where the control assembly is located and connected to an internal circuit of the functional module; and a movable stripe movably arranged on the functional module where the control assembly is located, the movable stripe is reciprocated so as to contact with or be far away from the contact head, thereby to control on and off states of the internal circuit of the functional module.

2. The wearable device according to claim 1, wherein the contact head is a contact column protruding from the outer surface of the functional module where the control assembly is located.

3. The wearable device according to claim 1, wherein the contact head protrudes from the outer surface of the functional module where the control assembly is located, and has a fixed height relative to the outer surface of the functional module.

4. The wearable device according to claim 1, wherein the contact head comprises:
a first end connected to the outer surface of the functional module where the control assembly is located; and
a second end in contact with the movable stripe and arranged opposite to the first end.

5. The wearable device according to claim 4, wherein the second end is of an oblique or cambered end surface, so as to guide the movable stripe to be in contact with the end surface of the second end.

6. The wearable device according to claim 1, wherein the movable stripe comprises:
a rotatable stripe capable of being rotated so as to contact with or be far away from the contact head; and
a rotatable member configured to connect the rotatable stripe onto the functional module and enable the rotatable stripe to be rotated.

7. The wearable device according to claim 6, wherein the rotatable member is secured onto the outer surface of the functional module, and
one end of the rotatable stripe is sleeved onto the rotatable member, and the other end is rotatable around the rotatable member so as to contact with or be far away from the contact head.

8. The wearable device according to claim 6, wherein the functional module comprises two side surfaces arranged opposite to each other, two main surfaces arranged opposite to each other, and two connection end surfaces arranged opposite to each other and configured to be connected to the main body or the other functional modules,
the rotatable stripe at least comprises a first movable stripe member connected to the rotatable member, and a second movable stripe member in contact with the contact head and formed by curving the first movable stripe member;
the contact head is arranged on at least one of the side surfaces, the rotatable member is arranged on at least one of the connection end surfaces and adjacent to the side surface where the contact head is arranged, and the first movable stripe member is rotatable around the rotatable member so as to drive the second movable stripe member to move to the side surface, thereby to enable the second movable stripe member to contact with the contact head, or drive the second movable stripe member to move to the main surface, thereby to enable the second movable stripe member to be far away from the contact head, or
the contact head is arranged on at least one of the main surfaces, the rotatable member is arranged on at least one of the connection end surfaces, and the first movable stripe member is rotatable around the rotatable member so as to drive the second movable stripe member to move to the main surface, thereby to enable the second movable stripe member to contact with the contact head, or drive the second movable stripe member to move to the side surface, thereby to enable the second movable stripe member to be far away from the contact head.

9. The wearable device according to claim 1, wherein the movable stripe comprises a slidable stripe capable of being slid on the outer surface of the functional module, so as to contact with or be far away from the contact head; and a slidable member configured to connect the slidable stripe onto the functional module and enable the slidable stripe to be slid, wherein the contact head may be a thin metal sheet, when the slidable stripe is slid onto the thin metal sheet so as to be in contact therewith, the functional module is started up, and when the slidable stripe moves away from the thin metal sheet, the functional module is shut down.

10. The wearable device according to claim 1, wherein the control assembly further comprises at least one stopping member configured to stop the movable stripe when the movable stripe contacts with or is far away from the contact head, so as to prevent the movable stripe from being offset.

11. The wearable device according to claim 10, wherein the stopping member comprises a first stopping member through which the movable stripe is stopped when the movable stripe contacts with the contact head, and a second stopping member through which the movable stripe is stopped when the movable stripe is far away from the contact head.

12. The wearable device according to claim 11, wherein the first stopping member is arranged at the side surface of the functional module, and the second stopping member is arranged at the main surface of the functional module.

13. The wearable device according to claim 1, wherein the functional module comprises a housing provided with a plurality of ventilation holes, and a functional processing unit arranged within the housing.

14. The wearable device according to claim 1, wherein the functional module comprises two side surfaces arranged opposite to each other, two main surfaces arranged opposite to each other, and two connection end surfaces arranged opposite to each other and connected to the main body or the other functional modules, and the wearable device further comprises a connection sheet connecting the functional modules.

15. The wearable device according to claim 14, wherein the connection sheet is arranged between two adjacent functional modules and partially overlaps the main surfaces of the two adjacent functional modules, and the functional modules are connected to the connection sheet at positions where the functional modules overlap the connection sheet, respectively.

16. The wearable device according to claim 15, wherein one of the two adjacent functional modules is formed integrally with the connection sheet, and the other functional module is detachably connected to the connection sheet.

* * * * *